United States Patent [19]

Wearne

[11] Patent Number: 5,062,817
[45] Date of Patent: Nov. 5, 1991

[54] BOOMSTICK

[76] Inventor: Harry G. Wearne, Site 415, Comp. 14, R.R. #4, Courtenay, B.C., Canada, V9N 7J3

[21] Appl. No.: 669,750

[22] Filed: Mar. 15, 1991

[51] Int. Cl.$^5$ .............................................. B63B 7/04
[52] U.S. Cl. ........................................ 441/45; 441/47
[58] Field of Search ............................ 441/35, 44–54, 441/133, 134; 272/1 B; 114/218, 219, 266, 267, 220; 152/220

[56] References Cited

U.S. PATENT DOCUMENTS

| 359,765 | 3/1887 | Boutell | 441/48 |
| 2,175,197 | 10/1939 | Kent | 441/46 |
| 4,288,061 | 9/1981 | Moreau | 114/220 |
| 4,357,891 | 11/1982 | Sluys | 114/219 |
| 4,378,749 | 4/1983 | Leblanc | 114/220 |
| 4,406,241 | 9/1983 | Comte | 114/220 |
| 4,697,956 | 10/1987 | Plaisance | 114/220 |
| 4,843,992 | 7/1989 | Babikian | 441/44 |
| 5,007,609 | 4/1991 | Bredovskis | 114/214 |

Primary Examiner—Joseph F. Peters, Jr.
Assistant Examiner—Clifford T. Bartz
Attorney, Agent, or Firm—Townsend and Townsend

[57] ABSTRACT

A boomstick for use in log rafts is made of a hollow sheet pipe and therefore has a far longer life than conventional boomsticks made of wood. The boomstick is flexibly joined with other boomsticks and comprises a hollow steel pipe with an outside diameter to permit installation of pneumatic tires thereon, a plurality of tires installed on the pipe, end discs larger in diameter than the pipe, welded at both ends of the pipe to retain the tires on the pipe and provide a sealed pipe to float in water, and attachments on the boomstick for connection by attaching chains.

5 Claims, 1 Drawing Sheet

BOOMSTICK

TECHNICAL FIELD

The present invention relates to a boomstick for use in containing log rafts. More specifically, the present invention relates to a reusable boomstick that has a far longer life than boomsticks made from logs.

BACKGROUND ART

Where possible logs are cut on slopes adjacent inlets and rivers, moved from the felling site into the water where they are assembled into log rafts. Surrounding log rafts are a number of boomsticks. These are generally logs about 66 feet long with holes 2 feet from each end and are chained together to make a chain of logs to contain the floating saw logs. These rafts of logs are then towed down to sawmills for cutting and processing.

Boomsticks made of wood have only a limited life. They generally last for not much longer than four months as they are wrecked by toredo worms and the wood becomes water-logged and gradually sinks. Furthermore, the log is wasted and cannot be used in the mill. Boomsticks have an initial value of approximately $400.00 based on current day wood prices and then must be scrapped after a minimum of four months and perhaps up to several months. The value of the log may then by up to $100.00 if used for pulp. Thus there is a loss of at least $300.00 for each boomstick made from a log.

DISCLOSURE OF INVENTION

I have found that I can manufacture a boomstick out of a steel pipe which will last approximately twenty years and thus avoid the necessity of having to replace a log boomstick every few months and also utilize old pneumatic tires. This provides a use for old tires that otherwise are scrapped and pile up in dumps which eventually provide fire hazards. There are so many old automobile tires lying in dumps around the countrysides, and this invention provides one way to recycle some of these old tires.

The present invention provides a boomstick for use in flexibly joining with other boomsticks floating in water to contain a plurality of logs, the boomstick comprising a hollow pipe having an outside diameter to permit installation of pneumatic tires on the pipe, a plurality of pneumatic tires installed on the pipe, end discs larger in diameter than the pipe, welded at both ends of the pipe to retain the tires on the pipe and provide a sealed pipe to float in water, and attachment means at both ends of the pipe.

BRIEF DESCRIPTION OF DRAWINGS

In drawings which illustrate embodiments of the present invention.

BEST MODE FOR CARRYING OUT THE INVENTION

Figure 1:
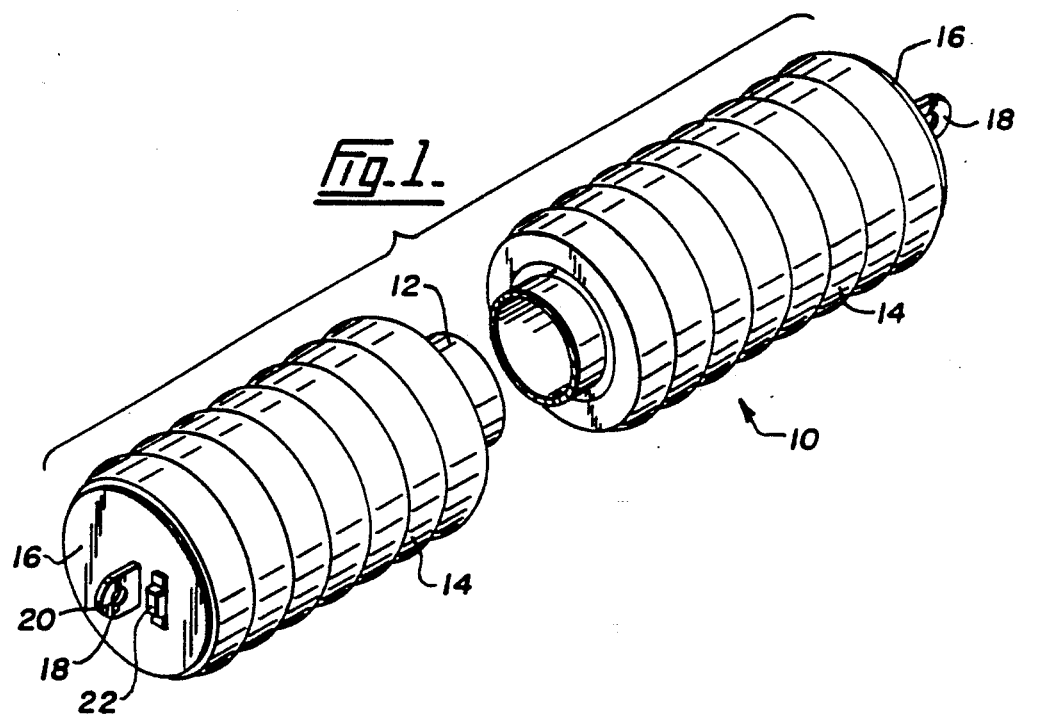
FIG. 1 is an isometric view showing a boomstick according to one embodiment of the present invention.
Figure 2:
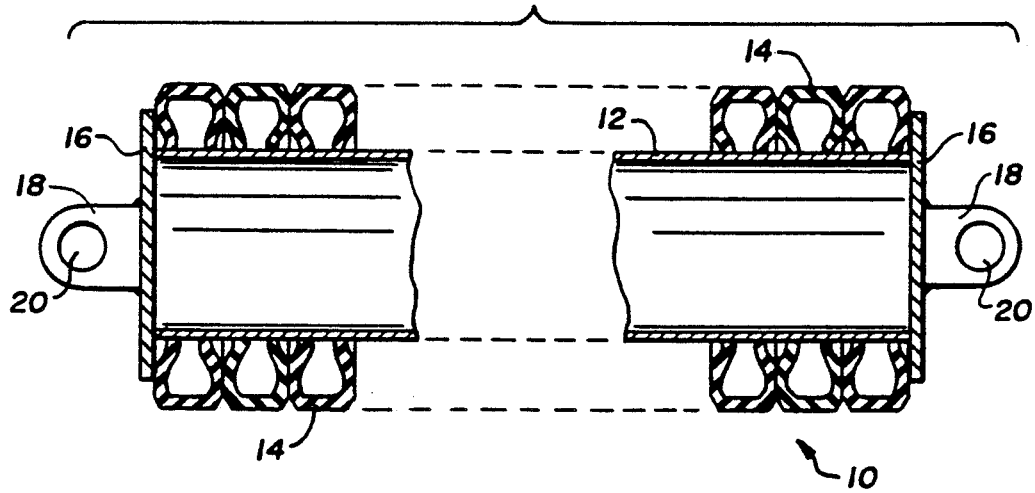
FIG. 2 is a longitudinal section through the boomstick shown in FIG. 1.

Referring to the drawings, the boomstick 10 is made out of a sixty foot pipe 12 which has a 12¾ inch outside diameter. The reason for the diameter of the pipe is so that it exactly fits old 13 inch pneumatic tires 14 that have been used on automobiles. The 13 inch pneumatic tires 14 have an inside diameter of between 12¾ and 13 inches and thus slide over the steel pipe 12. The number of tires 14 on the pipe will vary somewhat, depending on the width of each tire. It does not matter as to the number of tires 14, but the tires preferably extend for the length of the pipe. The tires act as bumpers when the boomstick 10 contains the logs or comes up against pilings, wharves, etc.

Two circular steel plates 16, approximately 18 inches diameter which is less than the outside diameter of the 13 inch pneumatic tires 14, are welded to the ends of the pipe 12 after the tires 14 have been inserted onto the pipe. The weld is a seal weld to ensure that there is no leakage into the pipe 12. Furthermore, before the second steel plate 16 is welded to the pipe 12, some oil is placed in the pipe to prevent rust therein.

Attached to the steel end plate 16 are flange plates 18 with 4 inch holes 20 therein. The holes 20 accommodate chains to join two adjacent boomsticks 10 together.

Before placing the tires 14 over the pipe 12 the pipe is painted with several coats of rust proof paint. After welding the steel plates 16 at each end, the welds are also protected by paint to avoid rust occurring. Furthermore, zinc electrodes 22 are welded onto the end plates 16. The zinc electrodes protect corrosion of the steel by electrolysis as the zinc becomes an anode which reacts to electrolysis prior to the steel.

In another embodiment a 4 inch steel pipe is welded crossways in the main pipe 12 approximately 2 feet from the end of the pipe 12. The 4 inch pipe provides a connection for a chain in place of the flange plates 18 and the holes 20. This is similar to the wooden log boom which has a 4 inch hole approximately 2 to 4 feet from each end of the boomstick. Other "attachment means" as claimed includes lugs and other arrangements that can be welded onto the steel pipe and permit connection by attachment chains or steel cables.

Figure 3:
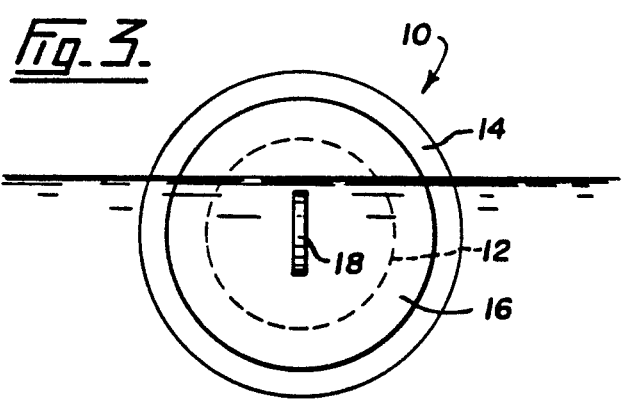
FIG. 3 is an end view showing the position of the boomstick floating in water.

As seen in FIG. 3, the boomstick of the present invention floats with at least about 60% of the boomstick 10 beneath water. This provides a stable boomstick which does not move around too much in waves as more than half of the boomstick is below water.

Whereas the boomstick has been defined for use with 13 inch tires, it will be apparent to those skilled in the art that the dimensions can change. Larger tires may be used in which case larger diameter pipes 12 must be provided so that the old pneumatic tires slide easily over the outside diameter of the pipes 12. The lengths of the pipes can also be varied to suit particular requirements. It is apparent that pipes much longer than 60 feet may not be suitable for boomsticks as the pipes flex and become unwieldy. Sixty feet lengths has been determined over the years as being the most suitable length for boomsticks.

Various changes may be made to the embodiments shown herein without departing from the scope of the present invention which is limited only by the attached claims.

The embodiments of the present invention in which an exclusive property or privilege is claimed are defined as follows:

1. A boomstick for use in flexibly joining with other boomsticks floating in water to contain a plurality of logs, the boomstick comprising:

a hollow pipe having an outside diameter to permit installation of unpressurized tires on the pipe, a plurality of unpressured tire installed on the pipe, end discs, larger in diameter than the pipe, welded at both ends of the pipe to retain the tires on the pipe and provide a sealed pipe to float in water, and attachment means on the boomstick for connection by attaching chains.

2. The boomstick according to claim 1 wherein the attachment means comprises flange plates extending exteriorally from each disc and welded thereto, the flange plates having holes therein for connection by attaching chains.

3. The boomstick according to claim 1 wherein the boomstick floats with at least about 60% under water.

4. The boomstick according to claim 1 wherein a small amount of oil is placed within the pipe before the discs are in place to prevent rust therein.

5. The boomstick according to claim 1 wherein zinc electrodes are attached to the end discs.

* * * * *